(12) United States Patent
Lin et al.

(10) Patent No.: US 11,640,878 B2
(45) Date of Patent: *May 2, 2023

(54) WINDING CAPACITOR PACKAGE STRUCTURE AND METHOD OF MANUFACTURING THE SAME

(71) Applicant: APAQ TECHNOLOGY CO., LTD., Miaoli County (TW)

(72) Inventors: Chieh Lin, Hsinchu (TW); Chung-Jui Su, Kaohsiung (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 29 days.

This patent is subject to a terminal disclaimer.

(21) Appl. No.: 17/022,286

(22) Filed: Sep. 16, 2020

(65) Prior Publication Data
US 2021/0391118 A1 Dec. 16, 2021

(30) Foreign Application Priority Data
Jun. 10, 2020 (TW) .................................. 109119390

(51) Int. Cl.
*H01G 4/32* (2006.01)
*H01G 4/005* (2006.01)
*H01G 4/224* (2006.01)

(52) U.S. Cl.
CPC ............... *H01G 4/32* (2013.01); *H01G 4/005* (2013.01); *H01G 4/224* (2013.01)

(58) Field of Classification Search
CPC .......... H01G 4/32; H01G 4/005; H01G 4/224; H01G 4/232
(Continued)

(56) References Cited

U.S. PATENT DOCUMENTS 3,772,079 A * 11/1973 Louzon .................. H01G 4/224
29/25.42
6,414,838 B1 * 7/2002 Oyama .................. H01G 9/155
361/511
(Continued)

FOREIGN PATENT DOCUMENTS

CN 106298241 A * 1/2017 ............... H01G 2/08
CN 110428971 A * 11/2019
JP 4356302 B2 * 11/2009

*Primary Examiner* — Arun Ramaswamy
(74) *Attorney, Agent, or Firm* — Li & Cai Intellectual Property (USA) Office

(57) ABSTRACT

A winding capacitor package structure and a method of manufactured the same are provided. The winding capacitor package structure includes a winding assembly, a package assembly, a conductive assembly, and a bottom carrier frame. The winding assembly includes a winding positive foil and a winding negative foil. The winding assembly is enclosed by the package assembly. The package assembly includes a casing structure and a filling body received inside the casing structure. The casing structure includes a main casing for enclosing the filling body and a retaining body inwardly bent from a bottom side of the main casing. The filling body includes a plurality of layered structures, and each of the layered structure is connected between the winding assembly and the casing structure. Therefore, the filling body including the layered structures can be retained and limited inside the casing structure through the retaining body.

7 Claims, 17 Drawing Sheets

(58) Field of Classification Search
USPC ............ 361/301.5, 502, 523, 530, 531, 533
See application file for complete search history.

(56) References Cited

U.S. PATENT DOCUMENTS

| | | | | |
|---|---|---|---|---|
| 8,184,429 B2* | 5/2012 | Yamane | ................ | H01G 9/008 |
| | | | | 361/511 |
| 2011/0228446 A1* | 9/2011 | Stockman | ................ | H01G 9/12 |
| | | | | 361/434 |
| 2012/0229948 A1* | 9/2012 | Sawyer | ................ | H02M 7/003 |
| | | | | 361/301.1 |
| 2020/0118762 A1* | 4/2020 | Takeoka | ................ | H01G 2/106 |

* cited by examiner

WINDING CAPACITOR PACKAGE STRUCTURE AND METHOD OF MANUFACTURING THE SAME

CROSS-REFERENCE TO RELATED PATENT APPLICATION

This application claims the benefit of priority to Taiwan Patent Application No. 109119390, filed on Jun. 10, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a capacitor package structure and a method of manufacturing the same, and more particularly to a winding capacitor package structure and a method of manufacturing the same.

BACKGROUND OF THE DISCLOSURE

Various applications of capacitors include being used in home appliances, computer motherboards and peripherals, power supplies, communication products and automobiles. Capacitors such as solid electrolytic capacitors are mainly used to provide functions such as filtering, bypassing, rectifying, coupling, blocking and transforming. However, there is still room for improvement in the related art of the winding capacitor.

SUMMARY OF THE DISCLOSURE

In response to the above-referenced technical inadequacies, the present disclosure provides a winding capacitor package structure and a method of manufacturing the same.

In one aspect, the present disclosure provides a winding capacitor package structure, including a winding assembly, a package assembly, a conductive assembly, and a bottom carrier frame. The winding assembly includes a winding positive foil, a winding negative foil and two winding insulating separators. The package assembly is used for completely enclosing the winding assembly. The package assembly includes a casing structure and a filling body, the casing structure includes an accommodating space for receiving the winding assembly, and the filling body is received inside the accommodating space for completely enveloping the winding assembly. The conductive assembly includes a first conductive pin electrically contacting the winding positive foil and a second conductive pin electrically contacting the winding negative foil. The bottom carrier frame is disposed on a bottom portion of the casing structure so as to protect the filling body and match with the casing structure. One of the two winding insulating separators is disposed between the winding positive foil and the winding negative foil, and one of the winding positive foil and the winding negative foil is disposed between the two winding insulating separators. The first conductive pin includes a first embedded portion enclosed inside the package assembly and a first exposed portion exposed outside the package assembly, and the second conductive pin includes a second embedded portion enclosed inside the package assembly and a second exposed portion exposed outside the package assembly. The filling body includes a plurality of layered structures stacked on top of one another in sequence, each of the layered structures is connected between the winding assembly and the casing structure, and the layered structures have the same or different filling materials. The casing structure includes a main casing for enclosing the filling body and a retaining body inwardly bent from a bottom side of the main casing, and the filling body is retained and limited inside the casing structure by the retaining body.

In another aspect, the present disclosure provides a winding capacitor package structure, including a winding assembly, a package assembly, a conductive assembly, and a bottom carrier frame. The winding assembly includes a winding positive foil and a winding negative foil. The package assembly is used for completely enclosing the winding assembly, and the package assembly includes a casing structure and a filling body received inside the casing structure. The conductive assembly includes a first conductive pin electrically contacting the winding positive foil and a second conductive pin electrically contacting the winding negative foil. The bottom carrier frame is disposed on a bottom portion of the casing structure so as to protect the filling body and match with the casing structure. The filling body includes a plurality of layered structures, and each of the layered structures is connected between the winding assembly and the casing structure. The casing structure includes a main casing for enclosing the filling body and a retaining body inwardly bent from a bottom side of the main casing, and the filling body is retained and limited inside the casing structure by the retaining body.

In yet another aspect, the present disclosure provides a method of manufacturing a winding capacitor package structure, including: forming a base layer on an inner bottom surface of a casing structure; placing a winding assembly and a part of a conductive assembly inside an accommodating space of the casing structure, wherein the winding assembly is disposed on the base layer; sequentially forming a plurality of filling layers between the winding assembly and the casing structure; and then placing a bottom carrier frame on a bottom portion of the casing structure so as to match with the casing structure. The casing structure includes a main casing for enclosing the base layer and the filling layer and a retaining body inwardly bent from a bottom side of the main casing, and the base layer and the filling layer are retained and limited inside the casing structure by the retaining body.

Therefore, by virtue of "the filling body including a plurality of layered structures, and each of the layered structure being connected between the winding assembly and the casing structure" and "the casing structure including a main casing for enclosing the filling body and a retaining body inwardly bent from a bottom side of the main casing", the filling body including the layered structures can be retained and limited inside the casing structure by the retaining body.

Furthermore, by virtue of "sequentially forming a plurality of filling layers between the winding assembly and the casing structure" and "the casing structure including a main casing for enclosing the filling layer and a retaining body inwardly bent from a bottom side of the main casing", the filling body including the layered structures can be retained and limited inside the casing structure by the retaining body.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more completely understood from the following detailed description and accompanying drawings.

FIG. 7 is also a schematic view of a winding capacitor package structure according to the first embodiment of the present disclosure.

FIG. 15 is also a schematic view of a winding capacitor package structure according to the forth embodiment of the present disclosure.

DETAILED DESCRIPTION OF THE EXEMPLARY EMBODIMENTS

Figure 1:
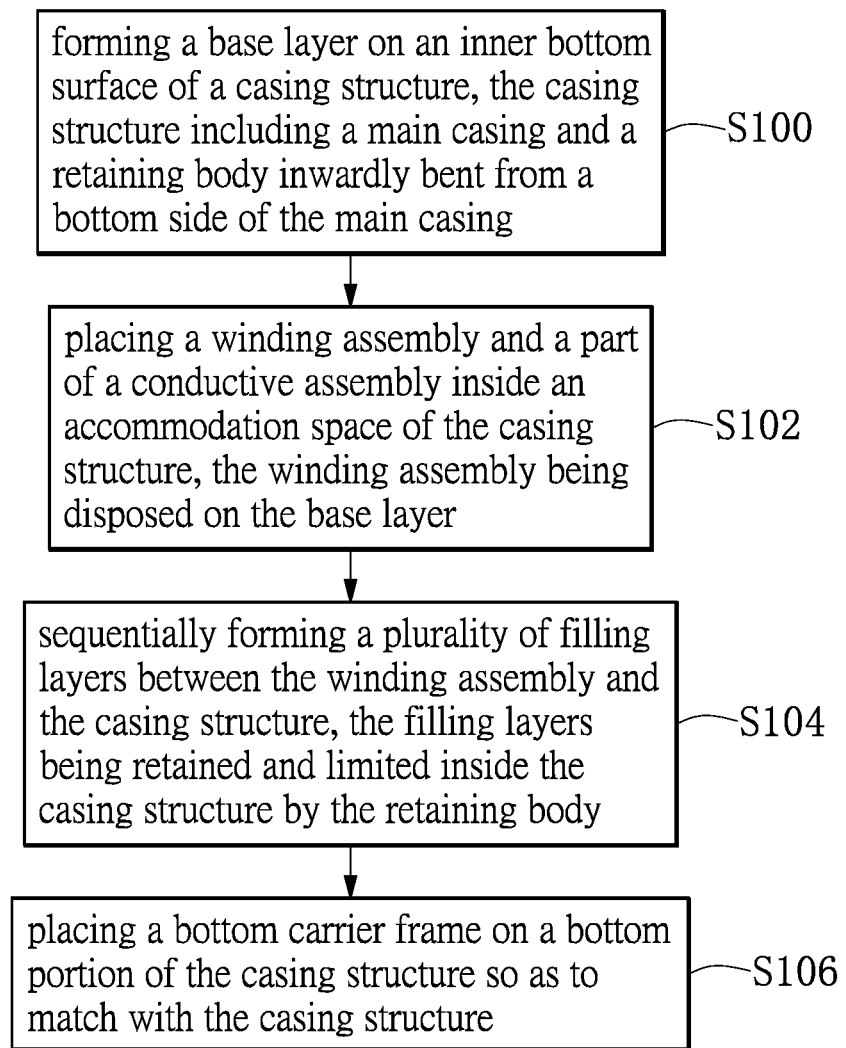
FIG. 1 is a flowchart of a method of manufacturing a winding capacitor package structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
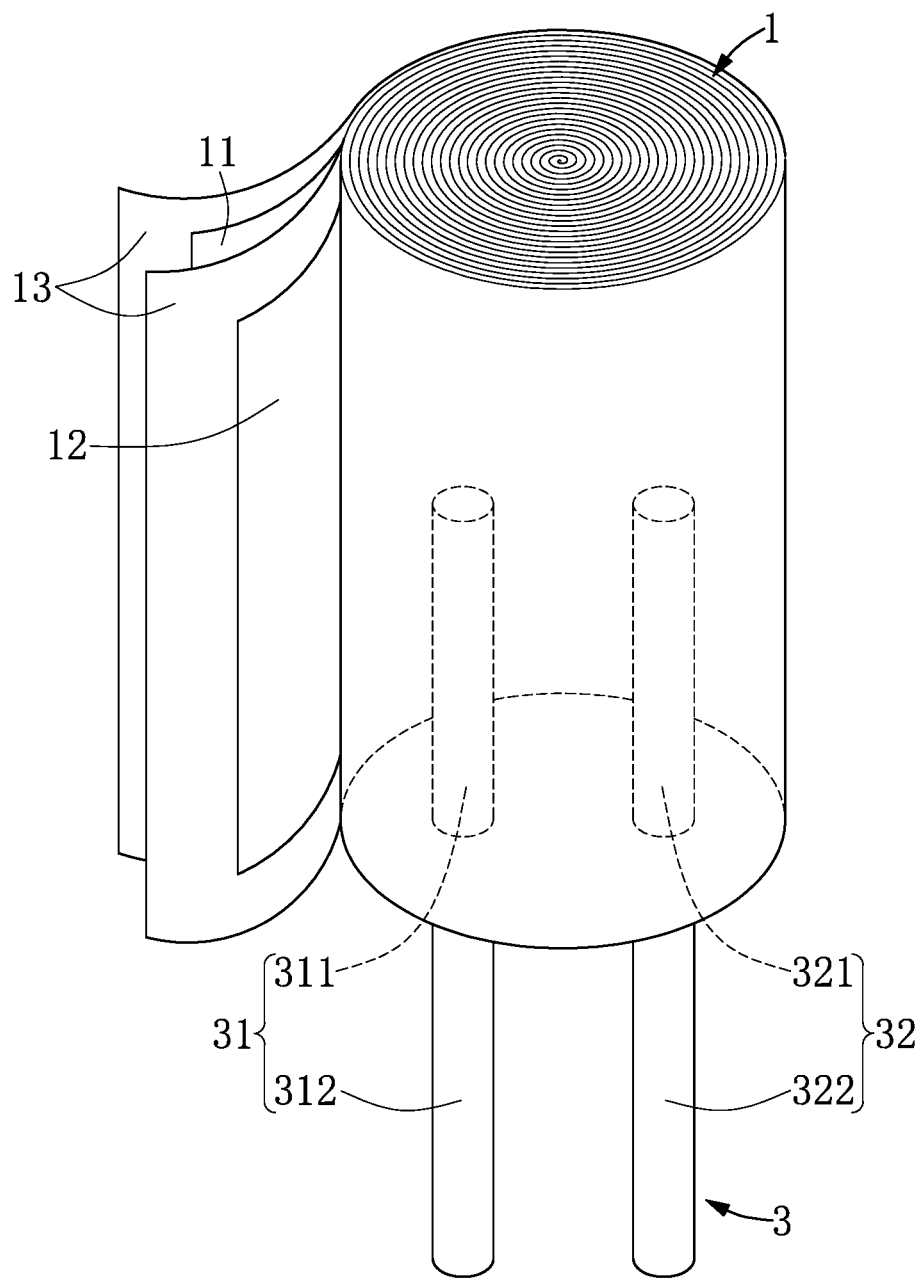
FIG. 2 is a perspective schematic view of a winding assembly of the winding capacitor package structure according to the present disclosure.
Figure 3:
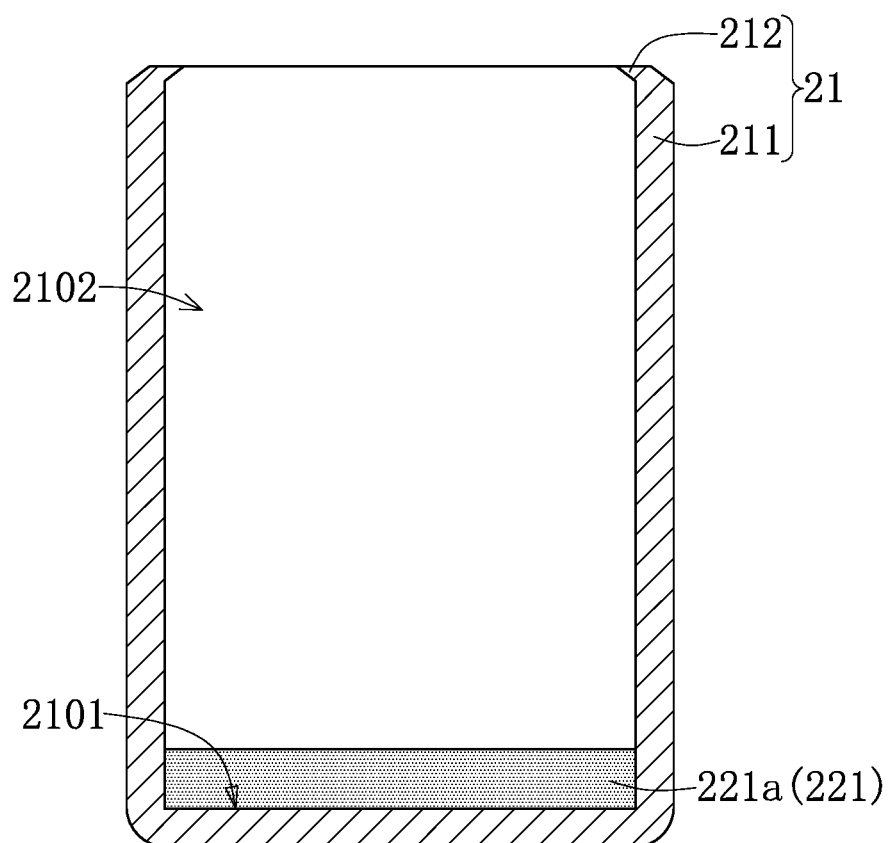
FIG. 3 is a schematic view of step S100 (forming a base layer on an inner bottom surface of the casing structure) of the method of manufacturing the winding capacitor package structure according to the first embodiment of the present disclosure.
Figure 4:
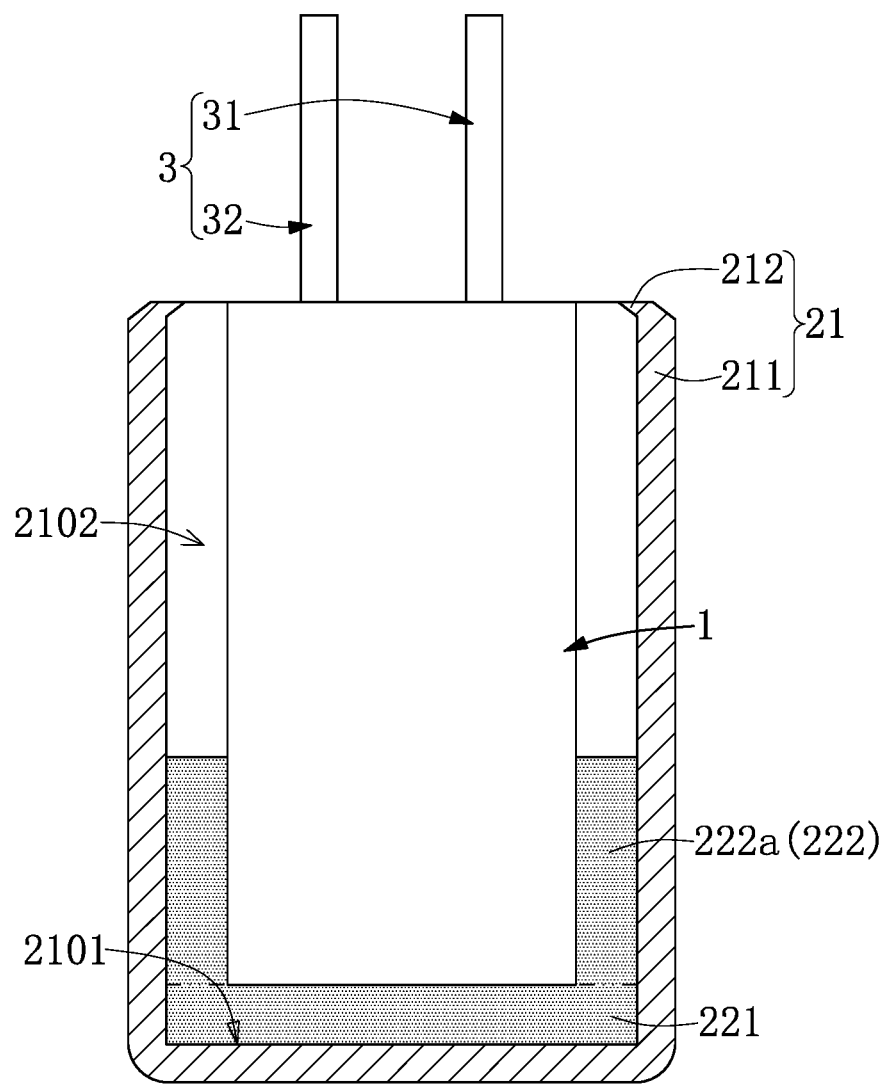
FIG. 4 is a schematic view of step S102 (placing the winding assembly and a part of the conductive assembly in the accommodating space of the casing structure) and step S104 (forming a filling layer between the winding assembly and the casing structure) of the method of manufacturing the winding capacitor package structure according to the first embodiment of the present disclosure.
Figure 5:
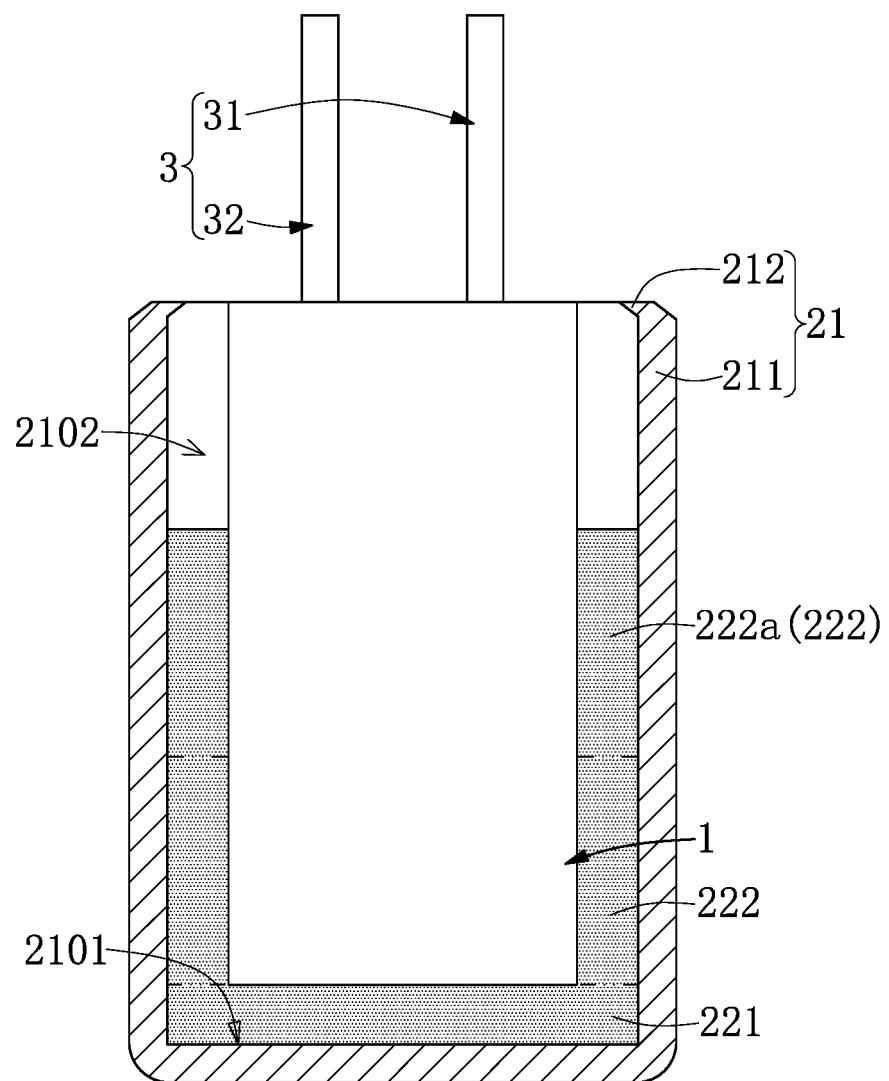
FIG. 5 is a schematic view step S104 (forming another filling layer between the winding assembly and the casing structure) of the method of manufacturing the winding capacitor package structure according to the first embodiment of the present disclosure.
Figure 6:
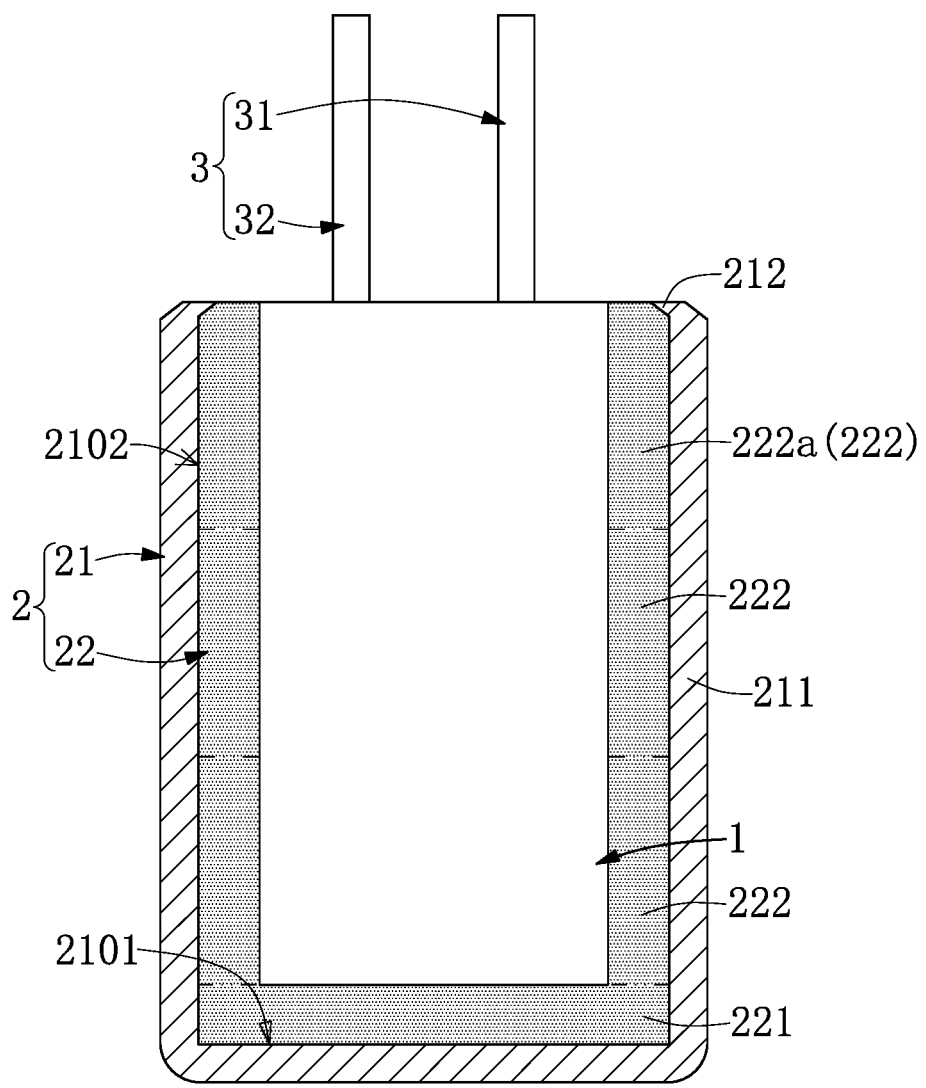
FIG. 6 is a schematic view of step S104 (forming yet another filling layer between the winding assembly and the casing structure) of the method of manufacturing the winding capacitor package structure according to the first embodiment of the present disclosure.
Figure 7:
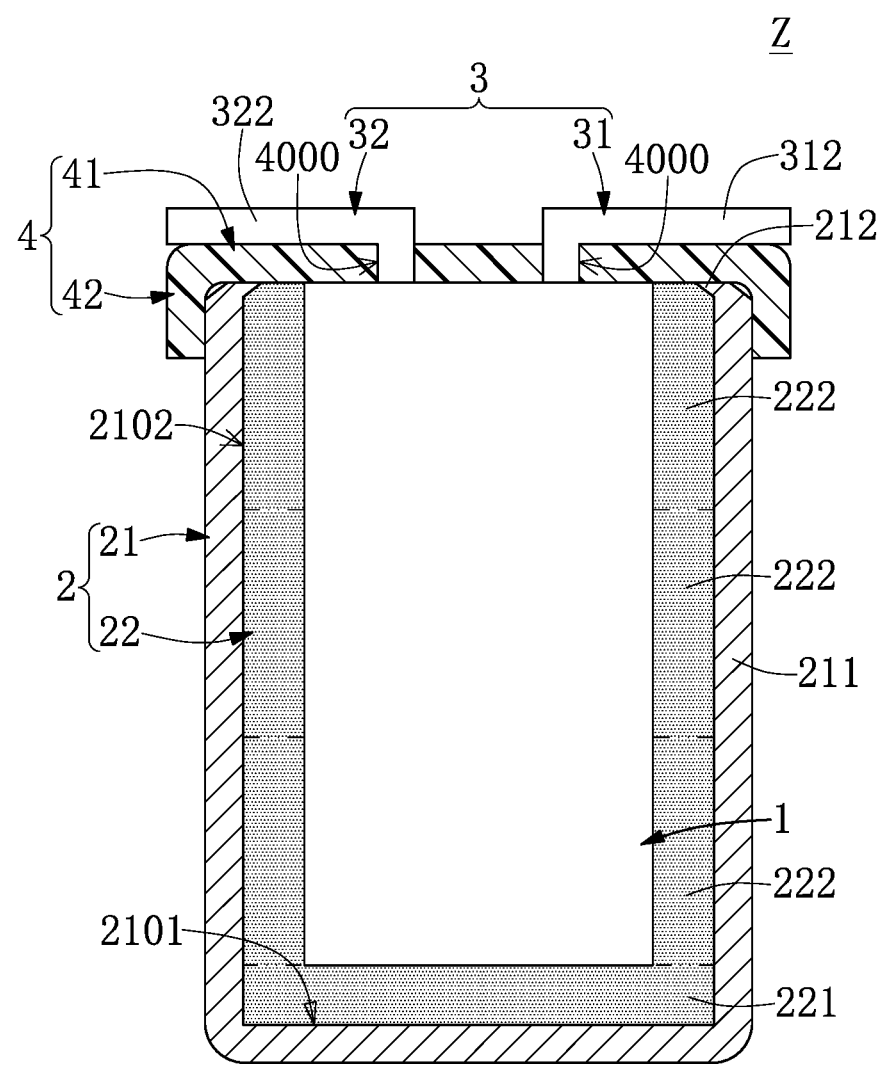
FIG. 7 is a schematic view of step S106 of the method of manufacturing the winding capacitor package structure according to the first embodiment of the present disclosure.

Referring to FIG. 1 to FIG. 7, a first embodiment of the present disclosure provides a method of manufacturing a winding capacitor package structure, including: firstly, referring to FIG. 1 and FIG. 3, forming a base layer 221 (such as a base resin layer) on an inner bottom surface 2101 of a casing structure 21, the casing structure 21 including a main casing 211 and a retaining body 212 inwardly bent from a bottom side of the main casing 211 (step S100); next, referring to FIG. 1 to FIG. 3, placing a winding assembly 1 and a part of a conductive assembly 3 inside an accommodating space 2102 of the casing structure 21, the winding assembly 1 being disposed on the base layer 221 (step S102); afterwards, referring to FIG. 1 and FIG. 4 to FIG. 6, sequentially forming a plurality of filling layers 222 (such as filling resin layers) between the winding assembly 1 and the casing structure 21, the filling layers 222 being retained and limited inside the casing structure 21 by the retaining body 212 (step S104); and then referring to FIG. 1 and FIG. 7, placing a bottom carrier frame 4 on a bottom portion of the casing structure 21 so as to match with the casing structure 21 (step S106).

For example, referring to FIG. 3, the step of forming the base layer 221 on the inner bottom surface 2101 of the casing structure 21 further includes: firstly, filling an initial substrate material 221a on the inner bottom surface 2101 of the casing structure 21; next, evacuating air from the accommodating space 2102 of the casing structure 21 to form a vacuum accommodating space; and then curing the initial substrate material 221a so as to form the base layer 221. Moreover, referring to FIG. 4 to FIG. 6, the step of forming each of the filling layers 222 between the winding assembly 1 and the casing structure 21 further includes: firstly, filling an initial filling material 222a between the winding assembly 1 and the casing structure 21; and then evacuating air from the accommodating space 2102 of the casing structure 21 to form a vacuum accommodating space; and then curing the initial filling material 222a so as to form the filling layer 222. However, the aforementioned description is merely an example and is not meant to limit the scope of the present disclosure. For example, the initial substrate material 221a and the initial filling material 222a can also be cured or hardened (such as thermal drying or natural drying) so as to respectively form the base layer 221 and the filling layer 222, so that the step of evacuating air from the accommodating space 2102 of the casing structure 21 can be omitted in the present disclosure.

Referring to FIG. 2 and FIG. 7, the first embodiment of the present disclosure provides a winding capacitor package structure Z, including a winding assembly 1, a package assembly 2, a conductive assembly 3 and a bottom carrier frame 4.

Firstly, as shown in FIG. 2, the winding assembly 1 includes a winding positive foil 11, a winding negative foil 12 and two winding insulating separators 13. More particularly, one of the two winding insulating separators 13 is disposed between the winding positive foil 11 and the winding negative foil 12, and one of the winding positive foil 11 and the winding negative foil 12 is disposed between the two winding insulating separators 13. For example, as shown in FIG. 2, the winding positive foil 11 is disposed between the two winding insulating separators 13. In addition, the winding insulating separator 13 may be an insulating paper or insulating foil containing a dipping material such as conductive polymer. However, the aforementioned description is merely an example and is not meant to limit the scope of the present disclosure.

Moreover, as shown in FIG. 7, the winding assembly 1 is completely enclosed by the package assembly 2, and the package assembly 2 includes a casing structure 21 (such as an Al casing or other metal casing) and a filling body 22 (such as a filling resin body). In addition, the casing structure 21 has an accommodating space 2102 (or a receiving space) for receiving the winding assembly 1, and the filling body 22 is filled inside the accommodating space 2102 for enclosing the winding assembly 1 (that is to say, the accommodating space 2102 can be filled with the filling body 22, so that the winding assembly 1 can be surrounded by the filling body 22). More particularly, the casing structure 21 includes a main casing 211 for enclosing the filling body 22 and a retaining body 212 inwardly bent from a bottom side of the main casing 211, and the filling body 22 can be retained and limited inside the casing structure 21 by the retaining body. For example, the filling body 22 can be made of any insulative material such as epoxy or silicon. However, the aforementioned description is merely an example and is not meant to limit the scope of the present disclosure.

For example, as shown in FIG. 7, the filling body 22 includes a base layer 221 that is disposed between an inner bottom surface 2101 of the casing structure 21 and a top surface of the winding assembly 1, and a plurality of the filling layers 222 that are stacked on top of one another in sequence and disposed on the base layer 221. In addition, the bottom carrier frame 4 is tightly connected to an outermost one of the filling layers 222, and the other filling layers 222 are spaced apart from the bottom carrier frame 4. Moreover, a viscosity coefficient of the base layer 221 is different from or equals to a viscosity coefficient of the filling layers 222, and a heat conductivity coefficient of the base layer 221 is different from or equals to a heat conductivity coefficient of the filling layers 222. That is to say, the filling body 22 includes a plurality of layered structures (including a base layer 221 and a plurality of filling layers 222) stacked on top of one another in sequence, and each of the layered structures is connected between the winding assembly 1 and the casing structure 21, and a plurality of the layered structures have the same or different filling materials. However, the aforementioned description is merely an example and is not meant to limit the scope of the present disclosure.

Furthermore, referring to FIG. 2 and FIG. 7, the conductive assembly 3 includes a first conductive pin 31 electrically contacting the winding positive foil 11 and a second conductive pin 32 electrically contacting the winding negative foil 12. For example, the first conductive pin 31 includes a first embedded portion 311 enclosed inside the package assembly 2 and a first exposed portion 312 exposed outside the package assembly 2, and the second conductive pin 32 includes a second embedded portion 321 enclosed inside the package assembly 2 and a second exposed portion 322 exposed outside the package assembly 2. However, the aforementioned description is merely an example and is not meant to limit the scope of the present disclosure.

In addition, referring to FIG. 2 and FIG. 7, the bottom carrier frame 4 is disposed on a bottom portion of the casing structure 21 so as to protect the filling body 22 and match with the casing structure 21. For example, the bottom carrier frame 4 includes a covering portion 41 for contacting and covering the filling body 22, and a matching portion 42 for matching with the casing structure 21, and the matching portion 42 is downwardly extended from an outer periphery of the covering portion 41 so as to surround and contact the casing structure 21. Moreover, the bottom carrier frame 4 has at least two through holes 4000, and a part (an embedded part) of the first exposed portion 312 of the first conductive pin 31 and a part (an embedded part) of the second exposed portion 322 of the second conductive pin 32 are respectively disposed inside the at least two through holes 4000, and another part (an exposed part) of the first exposed portion 312 of the first conductive pin 31 and another part (an exposed part) of the second exposed portion 322 of the second conductive pin 32 are respectively disposed outside the at least two through holes 4000. It should be noted that another part (the exposed part) of the first exposed portion 312 of the first conductive pin 31 and another part (the exposed part) of the second exposed portion 322 of the second conductive pin 32 can be respectively bent toward two opposite directions and both can be bent at about a 90 degree angle and extend along the covering portion 41. However, the aforementioned description is merely an example and is not meant to limit the scope of the present disclosure.

Second Embodiment

Figure 8:
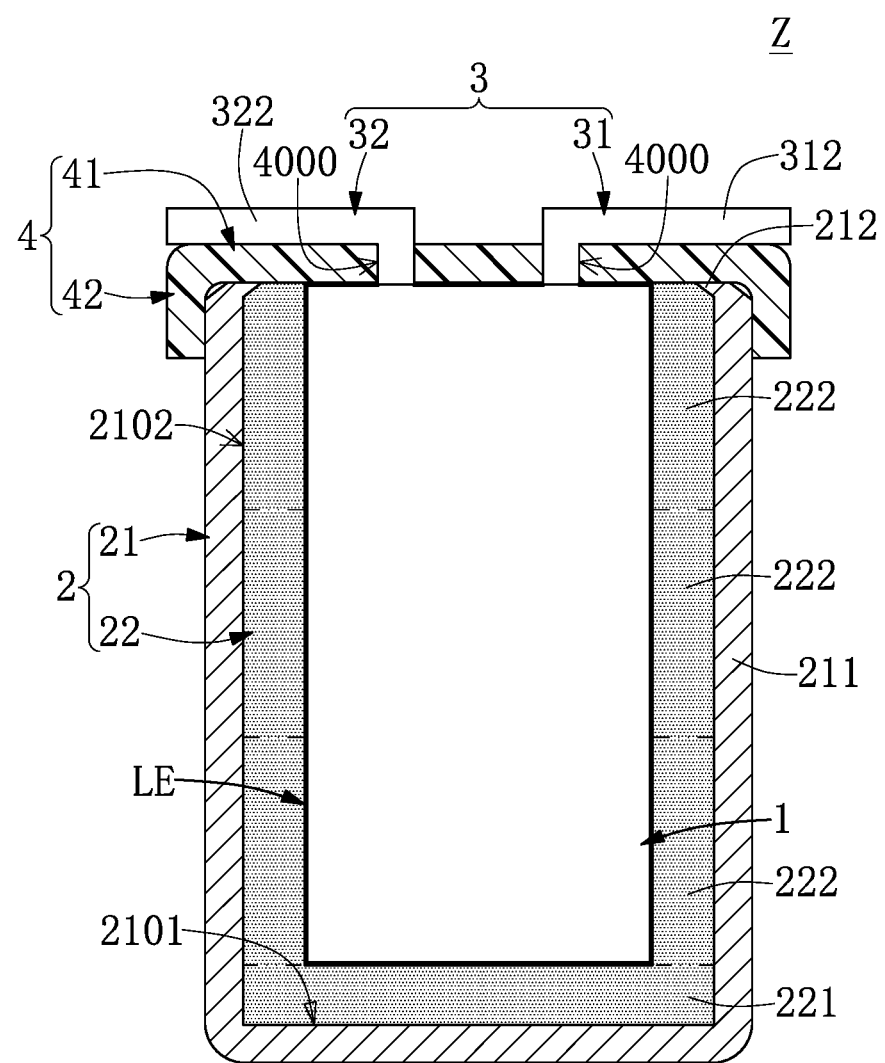
FIG. 8 is a schematic view of a winding capacitor package structure according to a second embodiment of the present disclosure.

Referring to FIG. 8, a second embodiment of the present disclosure provides a winding capacitor package structure Z, including a winding assembly 1, a package assembly 2, a conductive assembly 3 and a bottom carrier frame 4. Comparing FIG. 8 with FIG. 7, the difference between the second embodiment and the first embodiment is as follows: in the second embodiment, the winding assembly 1 can be completely enclosed by an enclosed moisture barrier layer LE, and a first junction that is between the winding assembly 1 and the first conductive pin 31 and a second junction that is between the winding assembly 1 and the second conductive pin 32 are covered by the enclosed moisture barrier layer LE so as to prevent external moisture from entering the winding capacitor package structure Z through the first junction or the second junction, so that the enclosed moisture barrier layer LE can be used to prevent the winding assembly 1 from rusting under the effect of external moisture.

Third Embodiment

Figure 9:
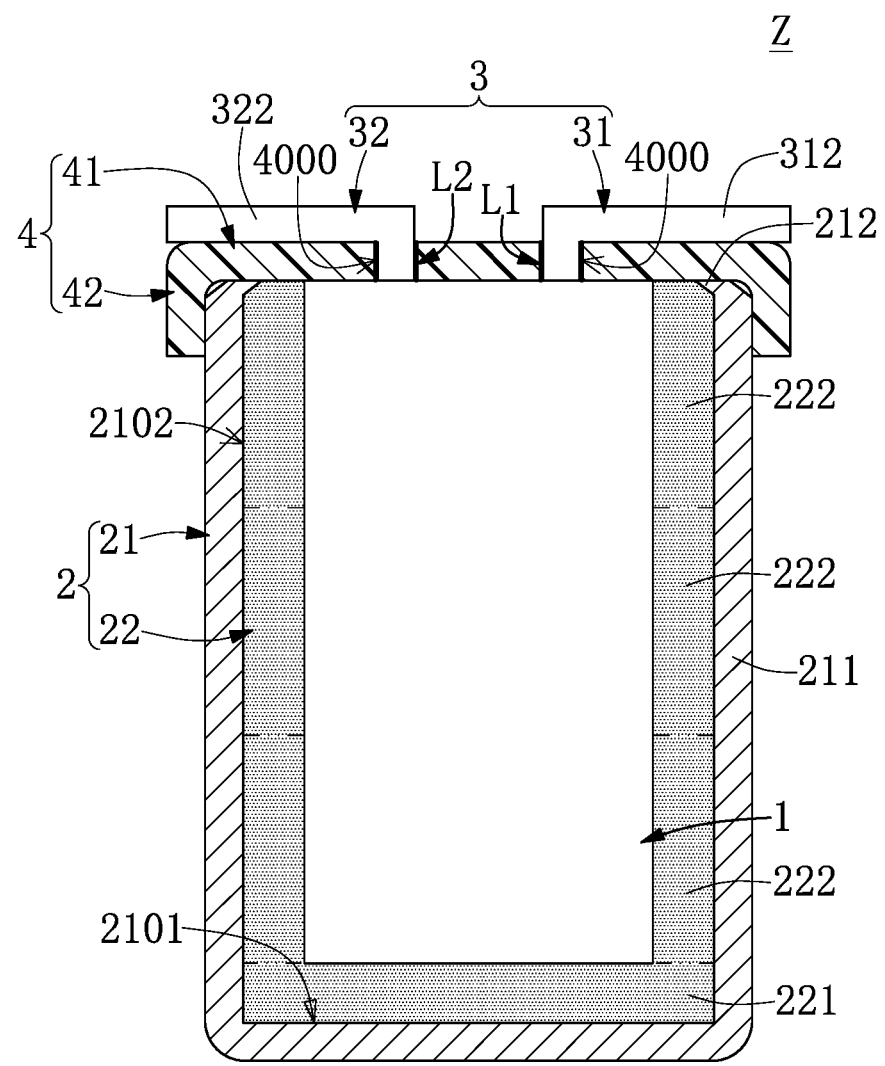
FIG. 9 is a schematic view of a winding capacitor package structure according to a third embodiment of the present disclosure.

Referring to FIG. 9, a third embodiment of the present disclosure provides a winding capacitor package structure Z, including a winding assembly 1, a package assembly 2, a conductive assembly 3, and a bottom carrier frame 4. Comparing FIG. 9 with FIG. 7, the difference between the third embodiment and the first embodiment is as follows: in the third embodiment, a part of the first conductive pin 31 is surrounded by a first moisture barrier layer L1, and a first junction between the winding assembly 1 and the first conductive pin 31 is covered by the first moisture barrier layer L1 so as to prevent external moisture from entering the winding capacitor package structure Z through the first junction, so that the first moisture barrier layer L1 can be used to prevent the winding assembly 1 from rusting under the effect of external moisture. In addition, a part of the second conductive pin 32 is surrounded by a second moisture barrier layer L2, and a second junction between the winding assembly 1 and the second conductive pin 32 is covered by the second moisture barrier layer L2 so as to prevent external moisture from entering the winding capacitor package structure Z through the second junction, so that the second moisture barrier layer L2 can be used to prevent the winding assembly 1 from rusting under the effect of external moisture.

Fourth Embodiment

Figure 10:
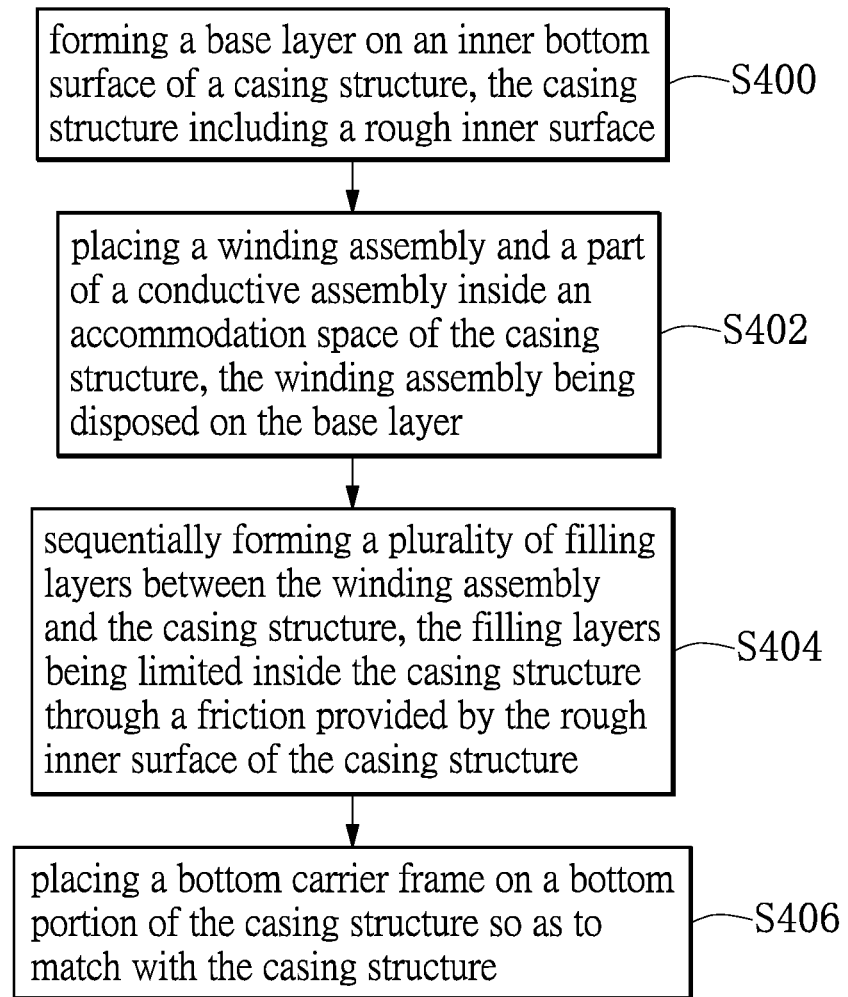
FIG. 10 is a flowchart of a method of manufacturing a winding capacitor package structure according to a forth embodiment of the present disclosure.
Figure 11:
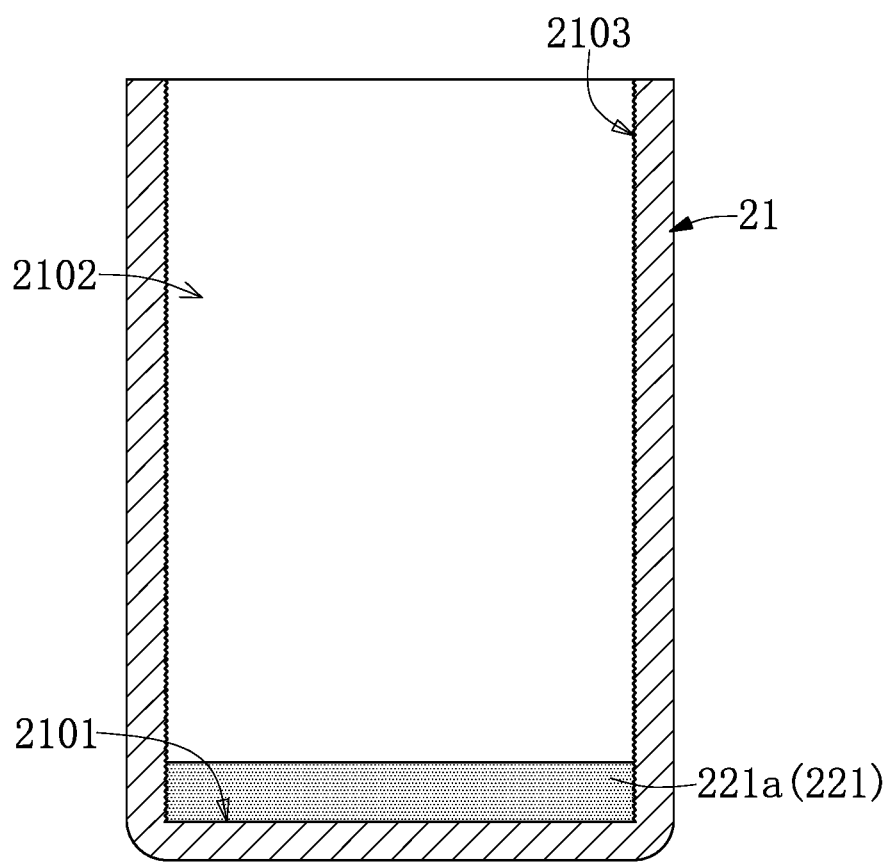
FIG. 11 is a schematic view of step S400 (forming a base layer on an inner bottom surface of the casing structure) of the method of manufacturing the winding capacitor package structure according to the forth embodiment of the present disclosure.
Figure 12:
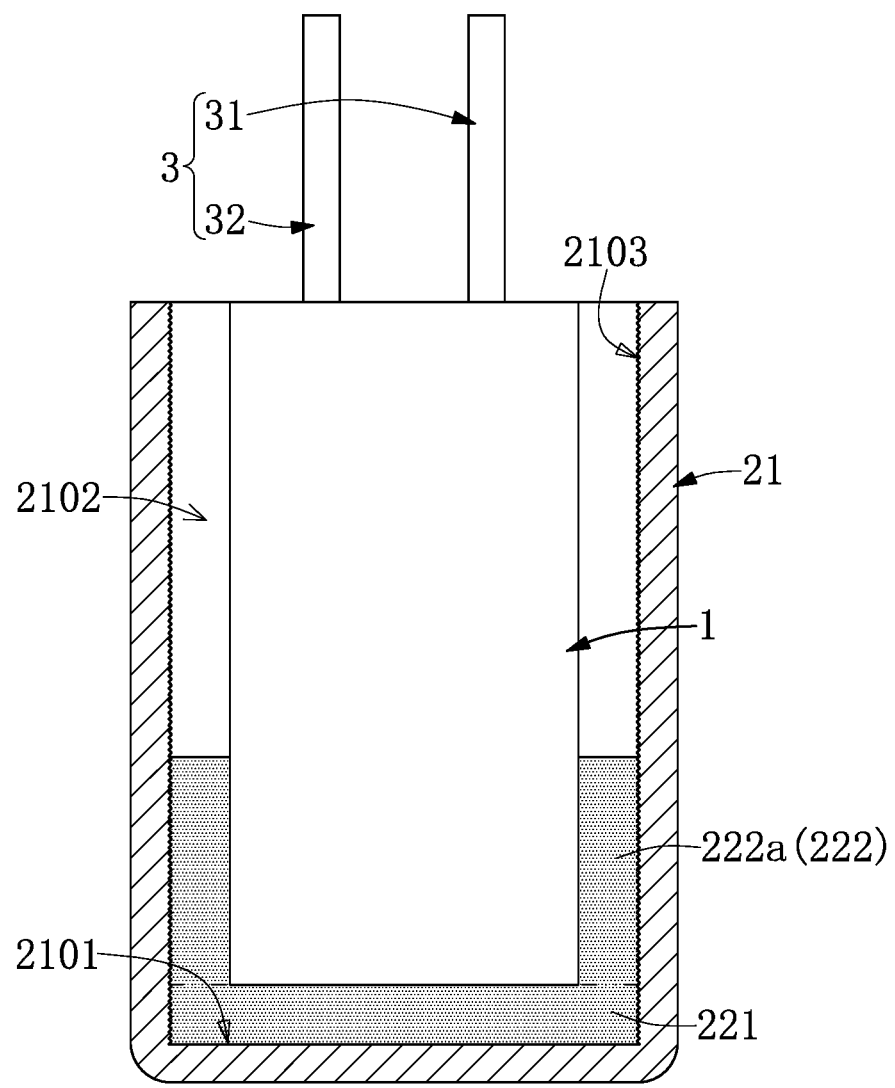
FIG. 12 is a schematic view of step S402 (placing the winding assembly and a part of the conductive assembly in the accommodating space of the casing structure) and step S404 (forming a filling layer between the winding assembly and the casing structure) of the method of manufacturing the winding capacitor package structure according to the forth embodiment of the present disclosure.
Figure 13:
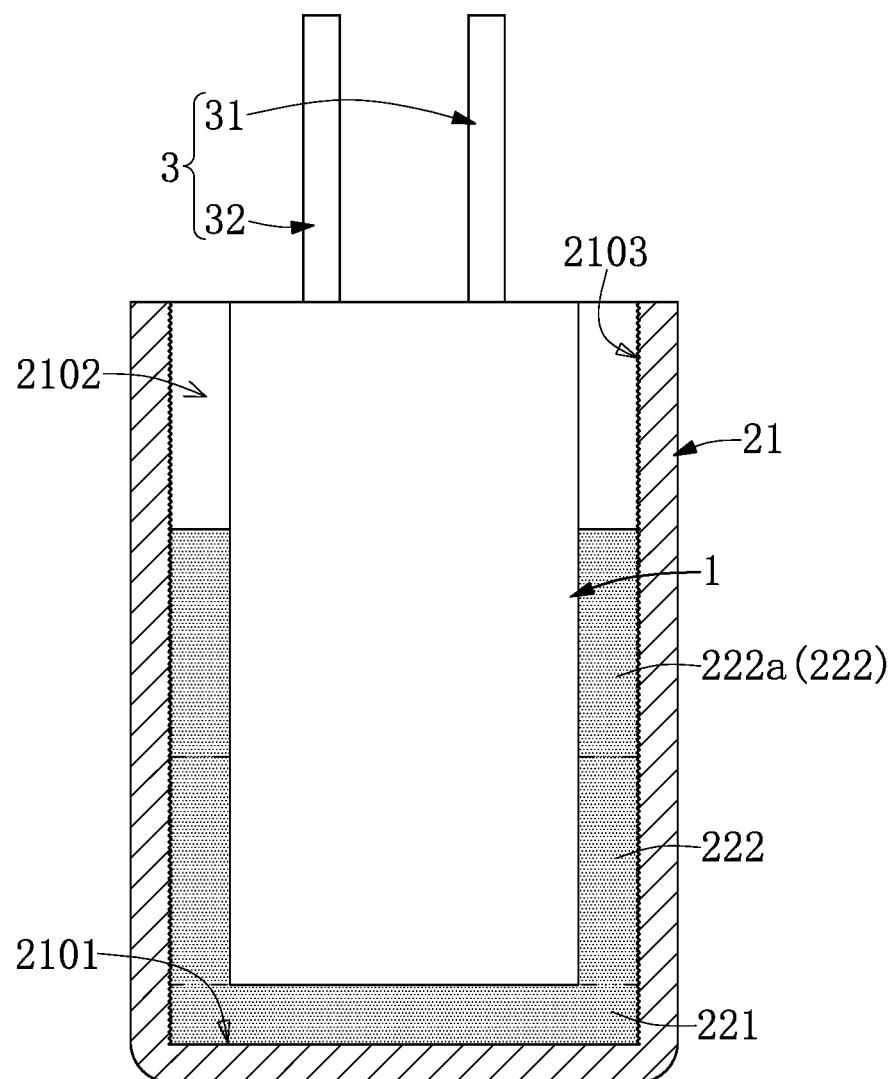
FIG. 13 is a schematic view of step S404 (forming another filling layer between the winding assembly and the casing structure) of the method of manufacturing the winding capacitor package structure according to the forth embodiment of the present disclosure.
Figure 14:
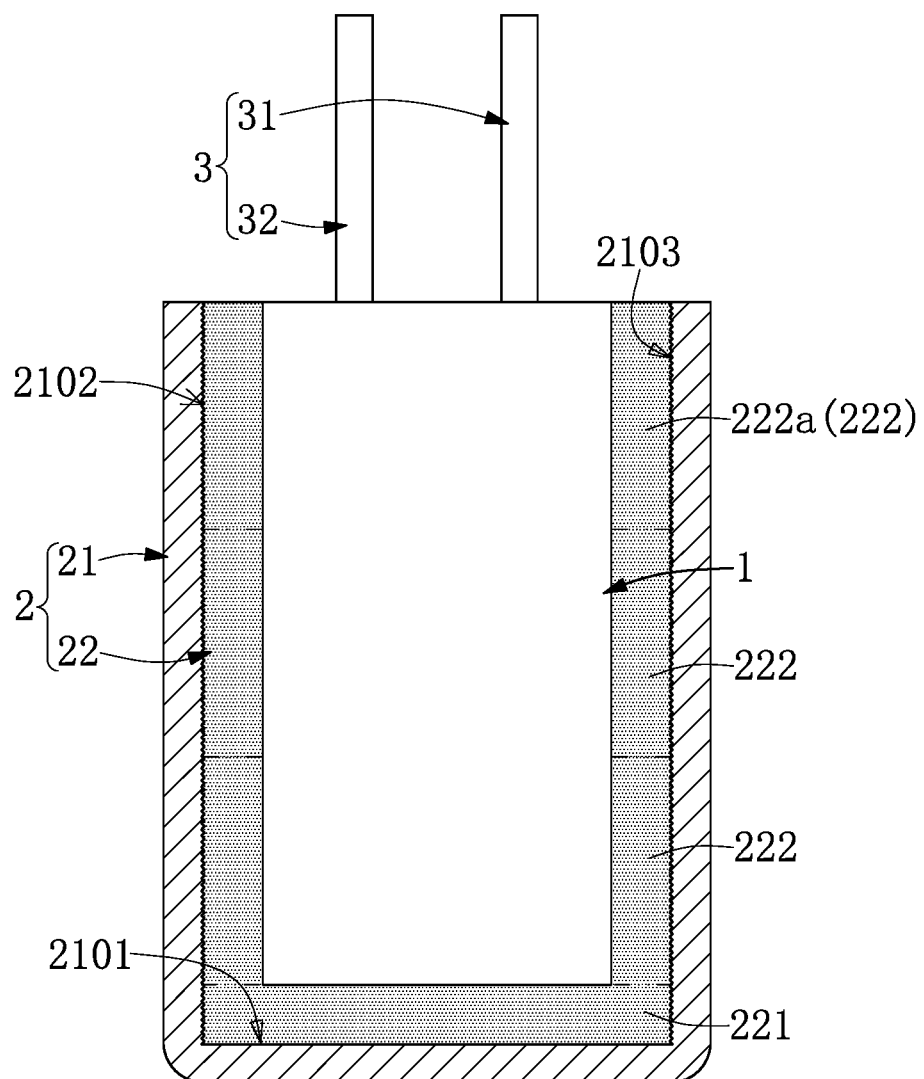
FIG. 14 is a schematic view of step S404 (forming yet another filling layer between the winding assembly and the casing structure) of the method of manufacturing the winding capacitor package structure according to the forth embodiment of the present disclosure.
Figure 15:
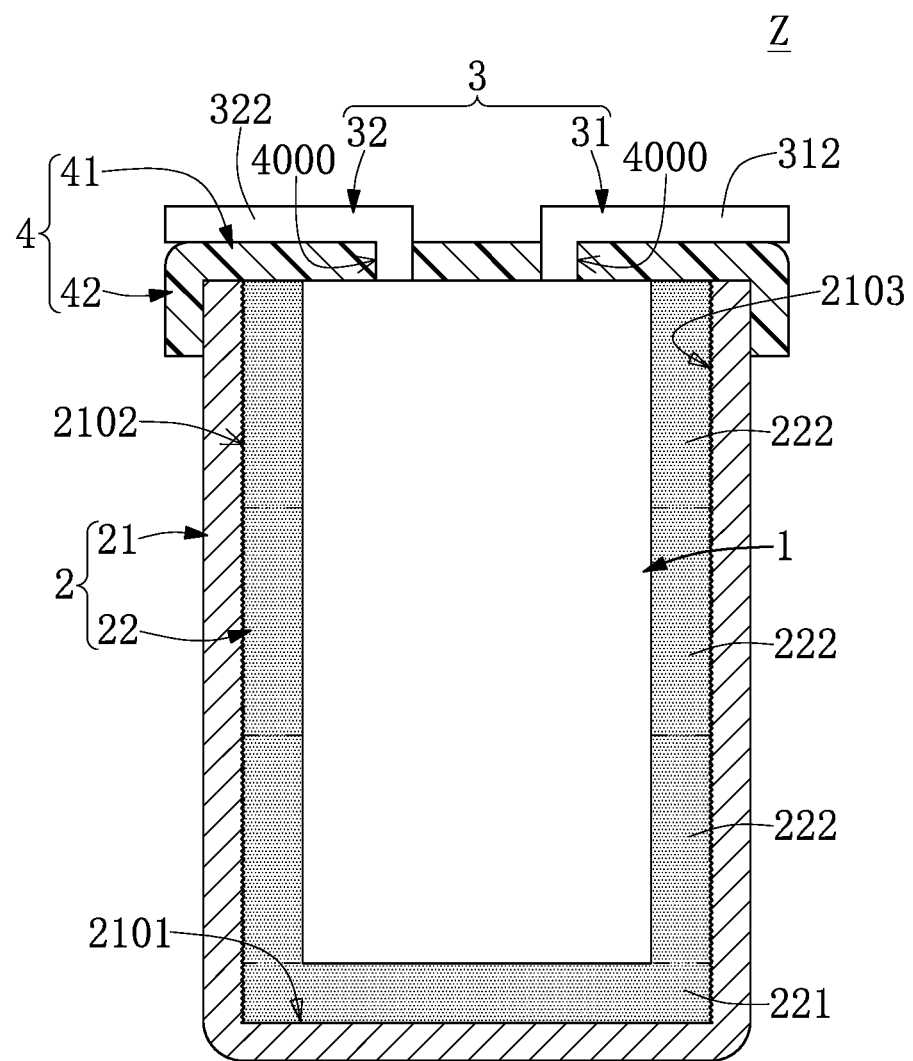
FIG. 15 is a schematic view of step S406 of the method of manufacturing the winding capacitor package structure according to the forth embodiment of the present disclosure.

Referring to FIG. 1 to FIG. 15, a fourth embodiment of the present disclosure provides a method of manufacturing a winding capacitor package structure Z, including: firstly, referring to FIG. 1 and FIG. 11, forming a base layer 221 on an inner bottom surface 2101 of a casing structure 21, the casing structure 21 including a rough inner surface 2103 (step S400); next, referring to FIG. 10 and FIG. 11, placing a winding assembly 1 and a part of a conductive assembly 3 inside an accommodating space 2102 of the casing structure 21, the winding assembly 1 being disposed on the base layer 221 (step S402); afterwards, referring to FIG. 10 and FIG. 12 to FIG. 14, sequentially forming a plurality of filling layers 222 between the winding assembly 1 and the casing structure 21, the filling layers 222 being limited inside the casing structure 21 through a friction provided by the rough inner surface 2103 of the casing structure 21 (step S404); and then referring to FIG. 10 and FIG. 15, placing a bottom carrier frame 4 on a bottom portion of the casing structure 21 so as to match with the casing structure 21 (step S406).

For example, referring to FIG. 10 and FIG. 11, the step of forming the base layer 221 on the inner bottom surface 2101 of the casing structure 21 further includes: firstly, filling an initial substrate material 221a on the inner bottom surface 2101 of the casing structure 21; next, evacuating air from the accommodating space 2102 of the casing structure 21 to form a vacuum accommodating space; and then curing the initial substrate material 221a so as to form the base layer 221. Moreover, referring to FIG. 10 and FIG. 12 to FIG. 14, the step of forming each of the filling layers 222 between the winding assembly 1 and the casing structure 21 further includes: firstly, filling an initial filling material 222a between the winding assembly 1 and the casing structure 21; next, evacuating air from the accommodating space 2102 of the casing structure 21 to form a vacuum accommodating space; and then curing the initial filling material 222a so as to form the filling layer 222. However, the aforementioned description is merely an example and is not meant to limit the scope of the present disclosure. For example, the initial substrate material 221a and the initial filling material 222a can also be cured or hardened (such as thermal drying or natural drying) so as to respectively form the base layer 221 and the filling layer 222, so that the step of evacuating air from the accommodating space 2102 of the casing structure 21 can be omitted in the present disclosure.

Referring to FIG. 15, the fourth embodiment of the present disclosure further provides a winding capacitor package structure Z, including a winding assembly 1, a package assembly 2, a conductive assembly 3, and a bottom carrier frame 4. The winding assembly 1, the conductive assembly 3 and the bottom carrier frame 4 of the fourth embodiment are the same as the winding assembly 1, the conductive assembly 3 and the bottom carrier frame 4 of the first embodiment, respectively.

Moreover, as shown in FIG. 15, the winding assembly 1 can be completely enclosed by the package assembly 2, and the package assembly 2 includes a casing structure 21 (such as an Al casing or other metal casing) and a filling body 22. In addition, the casing structure 21 has an accommodating space 2102 (or a receiving space) for receiving the winding assembly 1, and the filling body 22 is filled inside the accommodating space 2102 for enclosing the winding assembly 1 (that is to say, the accommodating space 2102 can be filled with the filling body 22, so that the winding assembly 1 can be surrounded by the filling body 22). More particularly, the casing structure 21 includes a rough inner surface 2103, and the filling body 22 is limited inside the casing structure 21 through a friction provided by the rough inner surface 2103 of the casing structure 21. For example, the filling body 22 can be made of any insulative material such as epoxy or silicon. However, the aforementioned description is merely an example and is not meant to limit the scope of the present disclosure.

For example, referring to FIG. 15, the filling body 22 includes a base layer 221 that is disposed between an inner bottom surface 2101 of the casing structure 21 and a top surface of the winding assembly 1, and a plurality of the filling layers 222 that are stacked on top of one another in sequence and disposed on the base layer 221. In addition, the bottom carrier frame 4 is tightly connected to an outermost one of the filling layers 222, and the other filling layers 222 are spaced apart from the bottom carrier frame 4. Moreover, a viscosity coefficient of the base layer 221 is different from or equals to a viscosity coefficient of the filling layers 222, and a heat conductivity coefficient of the base layer 221 is different from or equals to a heat conductivity coefficient of the filling layers 222. That is to say, the filling body 22 includes a plurality of layered structures (including a base layer 221 and a plurality of filling layers 222) stacked on top of one another in sequence, and each of the layered structures is connected between the winding assembly 1 and the casing structure 21, and a plurality of the layered structures have the same or different filling materials. However, the aforementioned description is merely an example and is not meant to limit the scope of the present disclosure.

Fifth Embodiment

Figure 16:
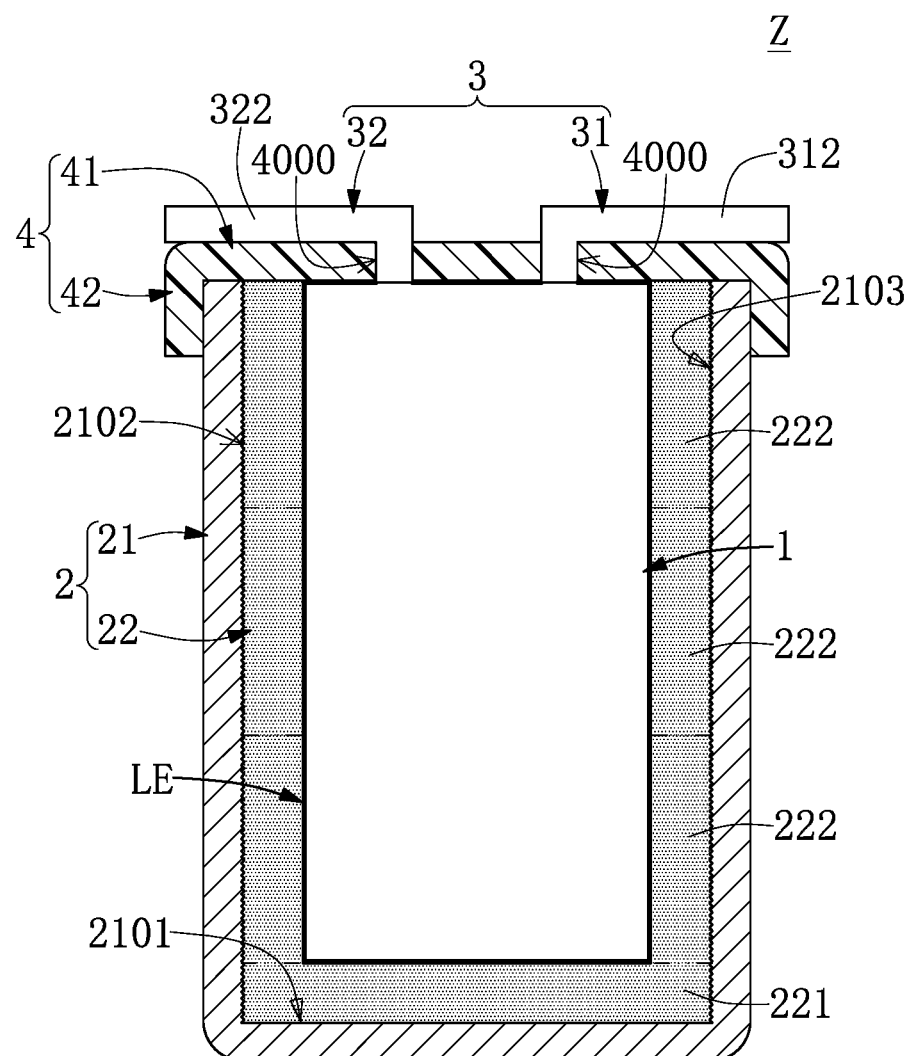
FIG. 16 is a schematic view of a winding capacitor package structure according to a fifth embodiment of the present disclosure.

Referring to FIG. 16, a fifth embodiment of the present disclosure provides a winding capacitor package structure Z, including a winding assembly 1, a package assembly 2, a conductive assembly 3 and a bottom carrier frame 4. Comparing FIG. 16 with FIG. 15, the difference between the fifth embodiment and the fourth embodiment is as follows: in the fifth embodiment, the winding assembly 1 can be completely enclosed by an enclosed moisture barrier layer LE, and a first junction that is between the winding assembly 1 and the first conductive pin 31 and a second junction that is between the winding assembly 1 and the second conductive pin 32 are covered by the enclosed moisture barrier layer LE so as to prevent external moisture from entering the winding capacitor package structure Z through the first junction or the second junction, so that the enclosed moisture barrier layer LE can be used to prevent the winding assembly 1 from rusting under the effect of external moisture.

Sixth Embodiment

Figure 17:
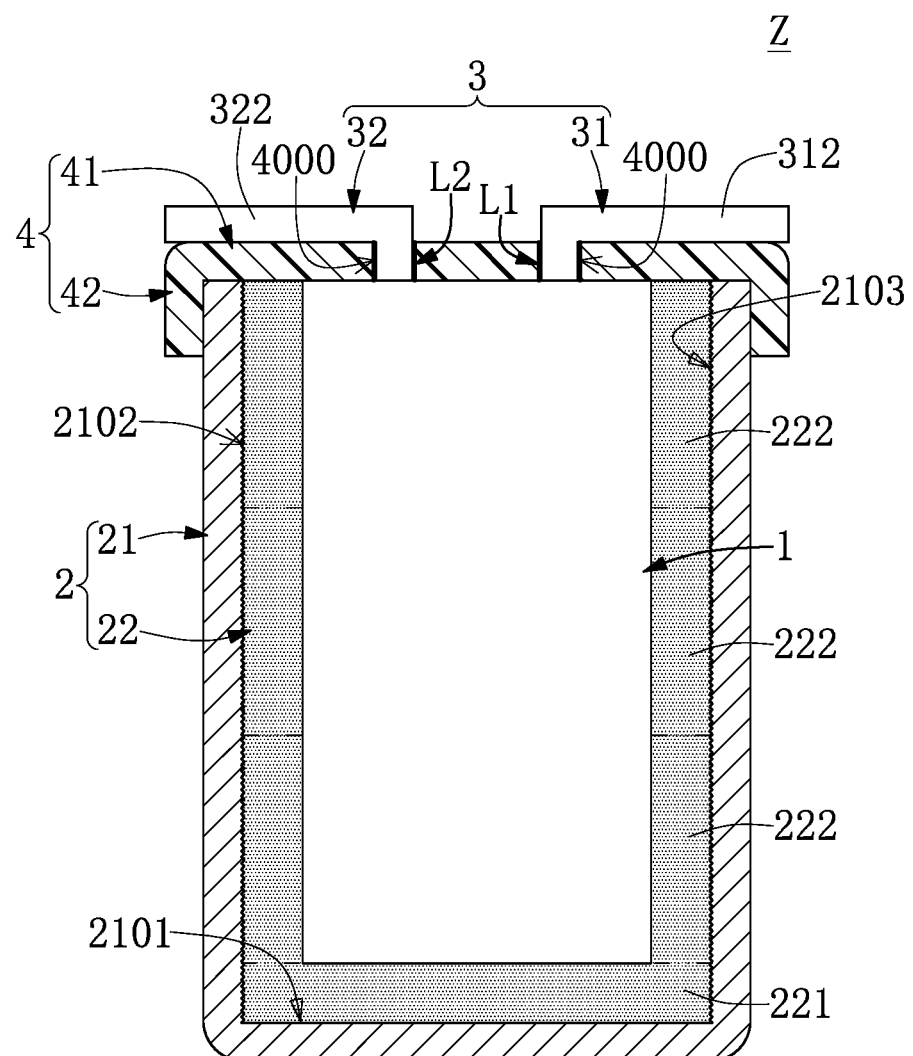
FIG. 17 is a schematic view of a winding capacitor package structure according to a sixth embodiment of the present disclosure.

Referring to FIG. 17, a sixth embodiment of the present disclosure provides a winding capacitor package structure Z, including a winding assembly 1, a package assembly 2, a conductive assembly 3, and a bottom carrier frame 4. Comparing FIG. 17 with FIG. 15, the difference between the sixth embodiment and the fourth embodiment is as follows: in the sixth embodiment, a part of the first conductive pin 31 is surrounded by a first moisture barrier layer L1, and a first junction between the winding assembly 1 and the first conductive pin 31 is covered by the first moisture barrier layer L1 so as to prevent external moisture from entering the winding capacitor package structure Z through the first junction, so that the first moisture barrier layer L1 can be used to prevent the winding assembly 1 from rusting under the effect of external moisture. In addition, a part of the second conductive pin 32 is surrounded by a second moisture barrier layer L2, and a second junction between the winding assembly 1 and the second conductive pin 32 is covered by the second moisture barrier layer L2 so as to prevent external moisture from entering the winding capacitor package structure Z through the second junction, so that the second moisture barrier layer L2 can be used to prevent the winding assembly 1 from rusting under the effect of external moisture.

It should be noted that the retaining body 212 of the first embodiment and the rough inner surface 2103 of the fourth embodiment can be disposed on the same casing structure 21, so that the filling body 22 can not only be retained and limited inside the casing structure 21 by the retaining body 212, but can also be limited inside the casing structure 22 through a friction provided by the rough inner surface 2103 of the casing structure 21, so as to enhance the effect for limiting the filling body 22 inside the casing structure 21.

In conclusion, by virtue of "the filling body 22 including a plurality of layered structures, and each of the layered structures being connected between the winding assembly 1 and the casing structure 21" and "the casing structure 21 including a main casing 211 for enclosing the filling body 22 and a retaining body 212 inwardly bent from a bottom side of the main casing 211", the filling body 22 including the layered structures can be retained and limited inside the casing structure 21 by the retaining body 212.

Furthermore, by virtue of "sequentially forming a plurality of filling layers 222 between the winding assembly 1 and the casing structure 21" and "the casing structure 21 including a main casing 211 for enclosing the filling layer 222 and a retaining body 212 inwardly bent from a bottom side of the main casing 211", the filling body 22 including the layered structures can be retained and limited inside the casing structure 21 by the retaining body 212.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A winding capacitor package structure, comprising:
   a winding assembly including a winding positive foil, a winding negative foil and two winding insulating separators;
   a package assembly for completely enclosing the winding assembly, wherein the package assembly includes a casing structure and a filling body, the casing structure includes an accommodating space for receiving the winding assembly, and the filling body is received inside the accommodating space for completely enveloping the winding assembly;
   a conductive assembly including a first conductive pin electrically contacting the winding positive foil and a second conductive pin electrically contacting the winding negative foil; and
   a bottom carrier frame disposed on a bottom portion of the casing structure so as to protect the filling body and match with the casing structure;
   wherein one of the two winding insulating separators is disposed between the winding positive foil and the winding negative foil, and one of the winding positive foil and the winding negative foil is disposed between the two winding insulating separators;

wherein the first conductive pin includes a first embedded portion enclosed inside the package assembly and a first exposed portion exposed outside the package assembly, and the second conductive pin includes a second embedded portion enclosed inside the package assembly and a second exposed portion exposed outside the package assembly;

wherein the filling body includes a plurality of layered structures stacked on top of one another in sequence, each of the layered structures is connected between the winding assembly and the casing structure, and the layered structures have the same or different filling materials;

wherein the casing structure includes a main casing for enclosing the filling body and a retaining body inwardly bent from a bottom side of the main casing, and the filling body is retained and limited inside the casing structure by the retaining body;

wherein both the first conductive pin and the second conductive pin are separate from the filling body;

wherein the retaining body is a single body disposed around the filling body;

wherein an enclosed moisture barrier layer contacts an entire outer surface of the winding assembly.

2. The winding capacitor package structure according to claim 1, wherein the filling body includes a base layer disposed between an inner bottom surface of the casing structure and a top surface of the winding assembly, and a plurality of filling layers stacked on top of one another in sequence and disposed on the base layer, the bottom carrier frame is tightly connected to an outermost one of the filling layers, and the other filling layers are spaced apart from the bottom carrier frame; wherein a viscosity coefficient of the base layer is different from or equals to a viscosity coefficient of the filling layer, and a heat conductivity coefficient of the base layer is different from or equals to a heat conductivity coefficient of the filling layer; wherein a first junction between the winding assembly and the first conductive pin and a second junction between the winding assembly and the second conductive pin are covered by the enclosed moisture barrier layer; wherein the casing structure includes a rough inner surface, and the filling body is limited inside the casing structure through a friction provided by the rough inner surface of the casing structure.

3. The winding capacitor package structure according to claim 1, wherein the filling body includes a base layer disposed between an inner bottom surface of the casing structure and a top surface of the winding assembly, and a plurality of filling layers stacked on top of one another in sequence and disposed on the base layer, the bottom carrier frame is tightly connected to an outermost one of the filling layers, and the other filling layers are spaced apart from the bottom carrier frame; wherein a viscosity coefficient of the base layer is different from or equals to a viscosity coefficient of the filling layer, and a heat conductivity coefficient of the base layer is different from or equals to a heat conductivity coefficient of the filling layer; wherein a part of the first conductive pin is surrounded by a first moisture barrier layer, and a first junction between the winding assembly and the first conductive pin is covered by the first moisture barrier layer; wherein a part of the second conductive pin is surrounded by a second moisture barrier layer, and a second junction between the winding assembly and the second conductive pin is covered by the second moisture barrier layer; wherein the casing structure includes a rough inner surface, and the filling body is limited inside the casing structure through a friction provided by the rough inner surface of the casing structure.

4. The winding capacitor package structure according to claim 1, wherein the bottom carrier frame includes a covering portion for contacting and covering the filling body, and a matching portion for matching with the casing structure, and the matching portion is downwardly extended from an outer periphery of the covering portion in order to surround and contact the casing structure; wherein the bottom carrier frame includes at least two through holes, a part of the first exposed portion of the first conductive pin and a part of the second exposed portion of the second conductive pin are respectively disposed inside the at least two through holes, and another part of the first exposed portion of the first conductive pin and another part of the second exposed portion of the second conductive pin are respectively disposed outside the at least two through holes.

5. A winding capacitor package structure, comprising:
a winding assembly including a winding positive foil and a winding negative foil;
a package assembly for completely enclosing the winding assembly, wherein the package assembly includes a casing structure and a filling body received inside the casing structure;
a conductive assembly including a first conductive pin electrically contacting the winding positive foil and a second conductive pin electrically contacting the winding negative foil; and
a bottom carrier frame disposed on a bottom portion of the casing structure so as to protect the filling body and match with the casing structure;
wherein the filling body includes a plurality of layered structures, and each of the layered structures is connected between the winding assembly and the casing structure;
wherein the casing structure includes a main casing for enclosing the filling body and a retaining body inwardly bent from a bottom side of the main casing, and the filling body is retained and limited inside the casing structure by the retaining body;
wherein both the first conductive pin and the second conductive pin are separate from the filling body;
wherein the retaining body is a single body disposed around the filling body;
wherein an enclosed moisture barrier layer contacts an entire outer surface of the winding assembly.

6. The winding capacitor package structure according to claim 5, wherein the filling body includes a base layer disposed between an inner bottom surface of the casing structure and a top surface of the winding assembly, and a plurality of filling layers stacked on top of one another in sequence and disposed on the base layer, the bottom carrier frame is tightly connected to an outermost one of the filling layers, and the other filling layers are spaced apart from the bottom carrier frame; wherein a viscosity coefficient of the base layer is different from or equals to a viscosity coefficient of the filling layer, and a heat conductivity coefficient of the base layer is different from or equals to a heat conductivity coefficient of the filling layer; wherein a first junction between the winding assembly and the first conductive pin and a second junction between the winding assembly and the second conductive pin are covered by the enclosed moisture barrier layer; wherein the casing structure includes a rough inner surface, and the filling body is limited inside the casing structure through a friction provided by the rough inner surface of the casing structure.

7. The winding capacitor package structure according to claim 5, wherein the filling body includes a base layer disposed between an inner bottom surface of the casing structure and a top surface of the winding assembly, and a plurality of filling layers stacked on top of one another in sequence and disposed on the base layer, the bottom carrier frame is tightly connected to an outermost one of the filling layers, and the other filling layers are spaced apart from the bottom carrier frame; wherein a viscosity coefficient of the base layer is different from or equals to a viscosity coefficient of the filling layer, and a heat conductivity coefficient of the base layer is different from or equals to a heat conductivity coefficient of the filling layer; wherein a part of the first conductive pin is surrounded by a first moisture barrier layer, and a first junction between the winding assembly and the first conductive pin is covered by the first moisture barrier layer; wherein a part of the second conductive pin is surrounded by a second moisture barrier layer, and a second junction between the winding assembly and the second conductive pin is covered by the second moisture barrier layer; wherein the casing structure includes a rough inner surface, and the filling body is limited inside the casing structure through a friction provided by the rough inner surface of the casing structure.

\* \* \* \* \*